United States Patent
Zimm et al.

(10) Patent No.: US 6,668,560 B2
(45) Date of Patent: Dec. 30, 2003

(54) ROTATING MAGNET MAGNETIC REFRIGERATOR

(75) Inventors: Carl B. Zimm, Madison, WI (US); Alexander Sternberg, Madison, WI (US); Alexander G. Jastrab, Cambridge, WI (US); Lewis M. Lawton, Jr., Barrington, IL (US); Andre M. Boeder, Monona, WI (US)

(73) Assignee: Astronautics Corporation of America, Milwaukee, WI (US)

( * ) Notice: Subject to any disclaimer, the term of this patent is extended or adjusted under 35 U.S.C. 154(b) by 0 days.

(21) Appl. No.: 10/316,650

(22) Filed: Dec. 11, 2002

(65) Prior Publication Data
US 2003/0106323 A1 Jun. 12, 2003

Related U.S. Application Data
(60) Provisional application No. 60/346,765, filed on Dec. 12, 2001.

(51) Int. Cl.[7] .................................................. F25B 21/00
(52) U.S. Cl. ............................................ 62/3.1; 62/467
(58) Field of Search ..................................... 62/3.1, 467

(56) References Cited

U.S. PATENT DOCUMENTS

| | | |
|---|---|---|
| 4,033,734 A | 7/1977 | Steyert, Jr. et al. |
| 4,069,028 A | 1/1978 | Brown |
| 4,107,935 A | 8/1978 | Steyert, Jr. |
| 4,112,699 A | 9/1978 | Hudson, III et al. |
| 4,203,740 A | 5/1980 | Vaseen |
| 4,332,135 A | 6/1982 | Barclay et al. |
| 4,392,356 A | 7/1983 | Brown |
| 4,408,463 A | * 10/1983 | Barclay ................. 62/3.1 |
| 4,441,325 A | 4/1984 | Bon-Mardion et al. |

(List continued on next page.)

OTHER PUBLICATIONS

K.A. Gschneidner, Jr., "Magnetic Refrigeration," in Rare Earths: Science, Technology and Applications III, The Minerals, Metals and Materials Society, 1997, pp. 209–221.

A.J. DeGregoria, et al., "Test Results of an Active Magnetic Regenerative Refrigerator," Advances in Cryogenic Engineering, vol. 37B, 1991, and Cryogenic Engineering Conf., 1991, Jun. 11–14, 1991, Hunstville, Alabama.

A.J. DeGregoria, et al., "Modelling the Active Magnetic Regenerator," Advances in Cryogenic Engineering, vol. 37B, 1991, and Cryogenic Engineering Conf., 1991, Jun. 11–14, 1991, Hunstville, Alabama.

C.R. Cross, et al., "Optimal Temperature–Entropy Curves for Magnetic Refrigeration," Advances in Cryogenic Engineering, vol. 33, pp. 767–776, 1998, and Cryogenic Engineering Conference, Jun., 1987.

L.D. Kirol, et al., "Rotary Recuperative Magnetic Heat Pump," in Advances in Cryogenic Engineering, 1988.

"The Big Chill . . . Magnetic Refrigeration Technology Makes a Cool Debut," the "Insider," Ames Laboratory, Department of Energy, Ames, Iowa, Feb., 1997.

"New Fridge Technology on the Horizon," The Capital Times, Feb. 21, 1997.

Primary Examiner—William C. Doerrler
(74) Attorney, Agent, or Firm—Foley & Lardner (57) ABSTRACT

A magnetic refrigeration apparatus has an annular container including a plurality of magnetic regenerator compartments containing magnetocaloric material, and a magnet mounted for rotation around the annular container, whereby the motion of the magnet produces a variation of magnetic field strength in the magnetic regenerator compartments, which in term leads to a variation in temperature of the magnetocaloric material in the magnetic regenerator compartments. Heat transfer fluid is propelled by a pump, and directed to and from the regenerator compartments and hot and cold heat exchangers by valves. Each valve includes an axial port and a plurality of radial ports.

63 Claims, 5 Drawing Sheets

U.S. PATENT DOCUMENTS

| | | | |
|---|---|---|---|
| 4,453,114 | A | 6/1984 | Nordlund |
| 4,459,811 | A | 7/1984 | Barclay et al. |
| 4,483,341 | A | 11/1984 | Witteles |
| 4,507,927 | A | 4/1985 | Barclay |
| 4,507,928 | A | 4/1985 | Johnson |
| 4,514,987 | A | 5/1985 | Pundak et al. |
| 4,532,770 | A | 8/1985 | Hakuraku et al. |
| 4,625,519 | A | 12/1986 | Hakuraku et al. |
| 4,702,090 | A | 10/1987 | Barclay et al. |
| 4,704,871 | A | 11/1987 | Barclay et al. |
| 4,727,721 | A | 3/1988 | Peschka et al. |
| 4,727,722 | A | 3/1988 | Kirol |
| 4,901,047 | A | 2/1990 | Wipf |
| 4,916,907 | A | 4/1990 | Munk et al. |
| 5,024,059 | A | 6/1991 | Noble |
| 5,091,361 | A * | 2/1992 | Hed .......................... 505/163 |
| 5,156,003 | A | 10/1992 | Yoshiro et al. |
| 5,165,242 | A | 11/1992 | Chang |
| 5,177,970 | A | 1/1993 | Chang |
| 5,182,914 | A | 2/1993 | Barclay et al. |
| 5,209,068 | A | 5/1993 | Saji et al. |
| 5,249,424 | A | 10/1993 | DeGregoria et al. |
| 5,332,029 | A | 7/1994 | Tokai et al. |
| 5,381,664 | A | 1/1995 | Bennett et al. |
| 5,444,983 | A | 8/1995 | Howard |
| 5,447,034 | A | 9/1995 | Kuriyama et al. |
| 5,641,424 | A | 6/1997 | Ziolo et al. |
| 5,743,095 | A | 4/1998 | Gschneidner, Jr. et al. |
| 5,887,449 | A | 3/1999 | Pecharsky et al. |
| 5,934,078 | A | 8/1999 | Lawton, Jr. et al. |
| 6,044,899 | A | 4/2000 | Langley et al. |
| 6,079,213 | A | 6/2000 | Driehuys et al. |
| 6,109,343 | A | 8/2000 | Langley et al. |
| 6,250,087 | B1 | 6/2001 | Owada et al. |
| 6,269,648 | B1 | 8/2001 | Hasson et al. |
| 6,293,111 | B1 | 9/2001 | Nacher et al. |
| 6,305,190 | B1 | 10/2001 | Driehuys et al. |
| 6,446,441 | B1 | 9/2002 | Dean |
| 6,467,274 | B2 | 10/2002 | Barclay et al. |
| 6,526,759 | B2 | 3/2003 | Zimm et al. |
| 2002/0053209 | A1 | 3/2002 | Zimm et al. |

* cited by examiner

ROTATING MAGNET MAGNETIC REFRIGERATOR

CROSS-REFERENCE TO RELATED APPLICATION

This application claims the benefit of provisional patent application No. 60/340,765, filed Dec. 12, 2001, the disclosure of which is incorporated by reference.

FIELD OF THE INVENTION

This invention relates generally to the field of magnetic refrigeration and to active magnetic regenerative refrigeration apparatus.

BACKGROUND OF THE INVENTION

Magnetic refrigeration, using magnetocaloric materials as a working element, promises to address important limitations associated with conventional refrigeration technologies which use gas compression and expansion. Magnetocaloric materials have the property that their temperature changes when a magnetic field is applied. In the case of a material near a transition from a ferromagnetic state to a paramagnetic state, the material will warm when magnetized and cool when demagnetized. Magnetic refrigeration can avoid the use of volatile fluids, such as chlorofluorocarbons (CFC's), that may harm the environment. Magnetic refrigeration can be more energy efficient than conventional refrigeration technologies. Magnetic refrigeration can also produce very low temperatures, which can enable, for example, cost-effective production of liquid hydrogen for use as an alternative fuel for transportation and other applications. Thus, there has long been motivation to find an effective apparatus for magnetic refrigeration.

Many magnetic refrigerators use active magnetic regeneration as an operating principle. The term active means that a magnetic field is applied to a magnetocaloric material and then removed. A regenerator is a thermal device that transfers heat into a heat transfer medium during one stage of a regenerative cycle, and then transfers heat out of that heat transfer medium during an opposite phase of the regenerative cycle. Active magnetic regeneration refers to a regenerator which applies a time-varying magnetic field and reciprocating flow of a heat transfer medium to an elongated container of magnetocaloric materials, to produce a temperature gradient along the container of magnetocaloric materials and to enable heat transfer into and out of the heat transfer medium. Active magnetic regeneration may be used in a magnetic refrigerator, to provide cooling, or in a heat pump, to provide heating.

In a typical active magnetic regenerator device, a bed of magnetocaloric material which is porous to a heat transfer fluid is connected to two heat exchangers, with mechanisms provided for magnetizing and demagnetizing the bed, and for effecting reciprocating fluid flow through the bed of magnetocaloric material from one heat exchanger to the other. A typical active magnetic regenerator device usually performs four basic operations: (1) bed magnetization, which increases the temperature of the magneto-caloric material in the bed by the magnetocaloric effect; (2) fluid transfer in the cold side to hot side direction, with warmed fluid flowing out of the bed into a hot side heat exchanger, where heat can be released; (3) bed demagnetization, which reduces the temperature of the magnetocaloric material in the bed by the magnetocaloric effect; and (4) fluid transfer in the hot side to cold side direction, with cooled fluid flowing out of the bed and into a cold side heat exchanger, where heat can be absorbed.

SUMMARY OF THE INVENTION

In accordance with the present invention, a magnetic refrigeration apparatus has a magnetic regenerator bed containing magnetocaloric material, a magnet, and a means for moving the magnet in a path adjacent to the magnetic regenerator bed, whereby the motion of the magnet produces a variation of magnetic field strength in the magnetic regenerator bed, which in turn leads to a variation in temperature of the magnetocaloric material.

In one aspect of the invention, the magnetic regenerator bed is comprised of a plurality of compartments arranged in a ring, and a magnet is attached to a rotating assembly which moves the magnet in a path around the ring.

In another aspect of the invention, a method of transferring heat comprises rotating a magnet around an annular container which includes a magnetic regenerator compartment containing magnetocaloric material. The rotation of the magnet produces a cyclic variation in magnetic field strength in the magnetic regenerator compartment. The variation in magnetic field strength causes a cyclic variation in temperature of the magnetocaloric material in the magnetic regenerator compartment.

In another aspect of the invention, a heat transfer apparatus comprises an annular container which includes a plurality of magnetic regenerator compartments, a magnet mounted for rotation about the central axis of the annular container, a heat exchanger, and a valve. Each magnetic regenerator compartment has a hot side and a cold side, and each magnetic regenerator compartment contains magnetocaloric material that allows the flow of heat transfer fluid through such magnetocaloric material. The valve has an axial port and a plurality of radial ports. The axial port of the valve is connected by a pipe to the hot heat exchanger, and each radial port of the valve is connected by a pipe to the hot side of a magnetic regenerator compartment. The rotation of the magnet produces a cyclic variation in magnetic field strength in the magnetic regenerator compartments. The variation in magnetic field strength causes a cyclic variation in temperature of the magnetocaloric material in the magnetic regenerator compartments. The valve is used to cause the heat transfer fluid to flow from the magnetic regenerator compartments to and from the heat exchanger at the appropriate time to exploit the cyclic variation of temperature of a magnetocaloric material for heat transfer.

In another aspect of the invention, a heat transfer apparatus includes an annular arrangement of a plurality of magnetic regenerator compartments containing magnetocaloric material, a magnet mounted for rotation about the central axis of the annular arrangement of magnetic regenerator compartments, and a valve having an axial port, a rotating inner assembly, and a plurality of radial ports, wherein the rotating inner assembly rotates synchronously with the rotation of the magnet to connect heat transfer fluid flow between the axial port and one or more of the radial ports.

A rotating magnet magnetic refrigerator according to such a preferred embodiment of the invention has several desirable features. Work input to the device is via circular motion that may be at constant speed. Forces are well balanced, so that the net drive force is mainly that necessary to drive the refrigeration process, and this force is nearly constant. Reciprocating flow occurs to the magnetocaloric material, allowing regenerative cycles to be performed, and yet dead volume effects in the heat exchangers or between the magnetocaloric material and the heat exchangers are minimized. Finally, the seals used in the valve can be of simple design, are exposed to minimal wear, and generate minimal friction.

Further objects, features and advantages of the invention will be apparent from the following detailed description when taken in conjunction with the accompanying drawings.

DETAILED DESCRIPTION OF THE INVENTION

Figure 1:
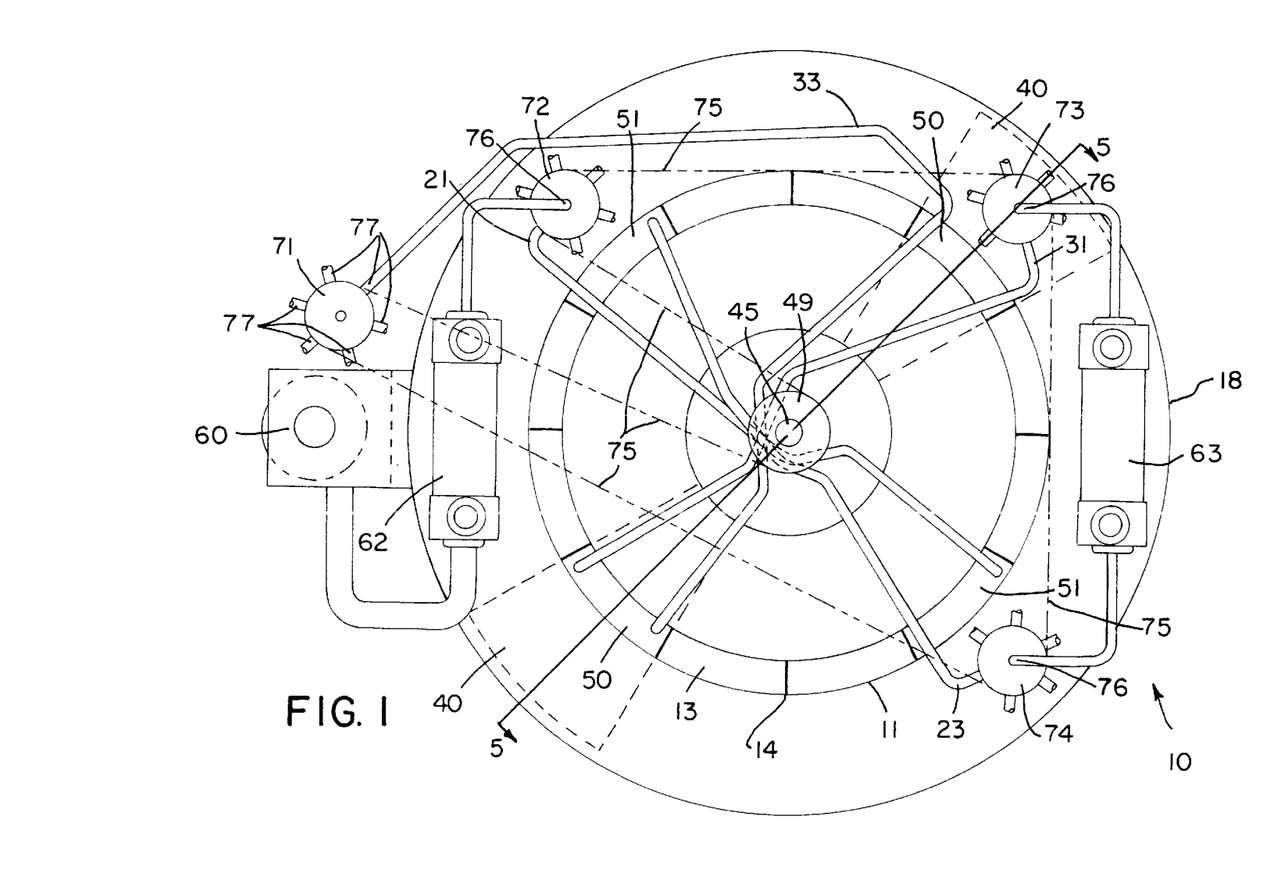
FIG. 1 is a plan view of a rotating magnet magnetic refrigerator in accordance with the invention.
Figure 2:
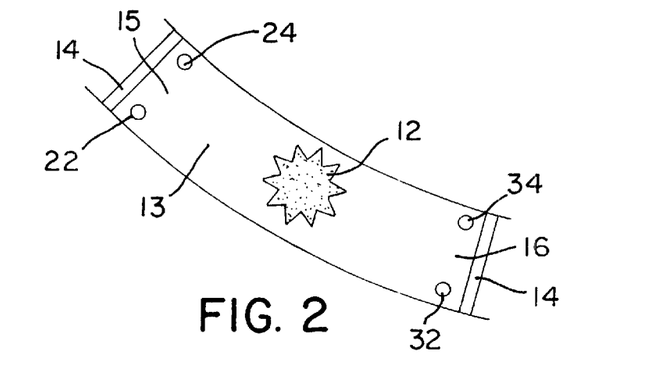
FIG. 2 is a plan view of an exemplary compartment containing magnetocaloric material.
Figure 3:
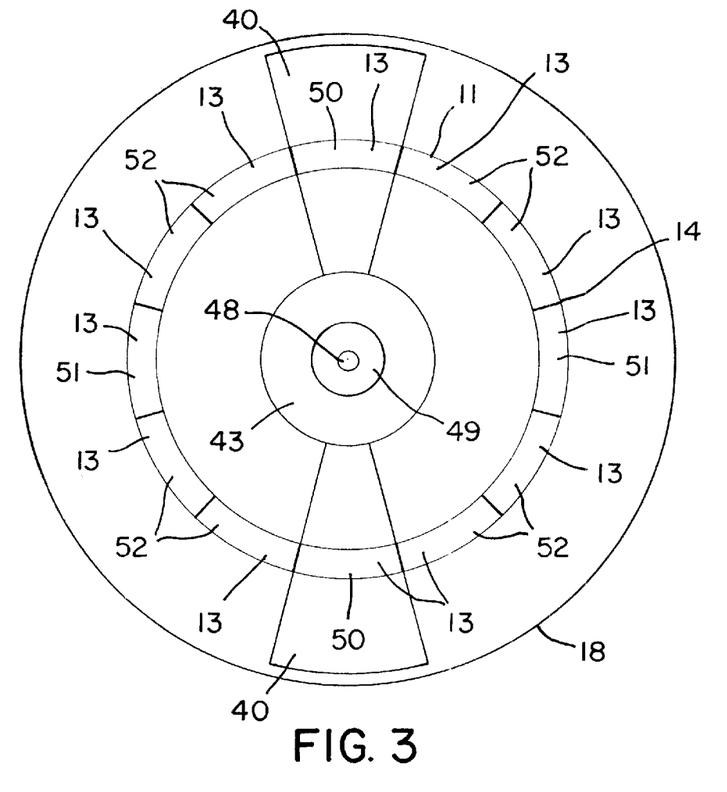
FIG. 3 is a plan view of the rotating magnet magnetic refrigerator of FIG. 1, with the heat transfer fluid components removed.

A preferred embodiment of a rotating magnet refrigerator according to the invention, indicated generally at 10, uses a stationary annular (ring shaped) container 11 of magnetocaloric material 12 separated into a number of compartments 13 (12 compartments are shown in FIG. 1) by radial boundaries 14, as illustrated in FIGS. 1–3. These radial boundaries 14 impede the flow of fluid and heat. Each compartment 13 has a cold side 15 and a hot side 16, and the magnetocaloric material 12 therein is porous to fluid flow, allowing heat transfer fluid 17 to be made to flow alternately from the cold side 15 to the hot side 16, or from the hot side 16 to the cold side 15.

Figure 4:
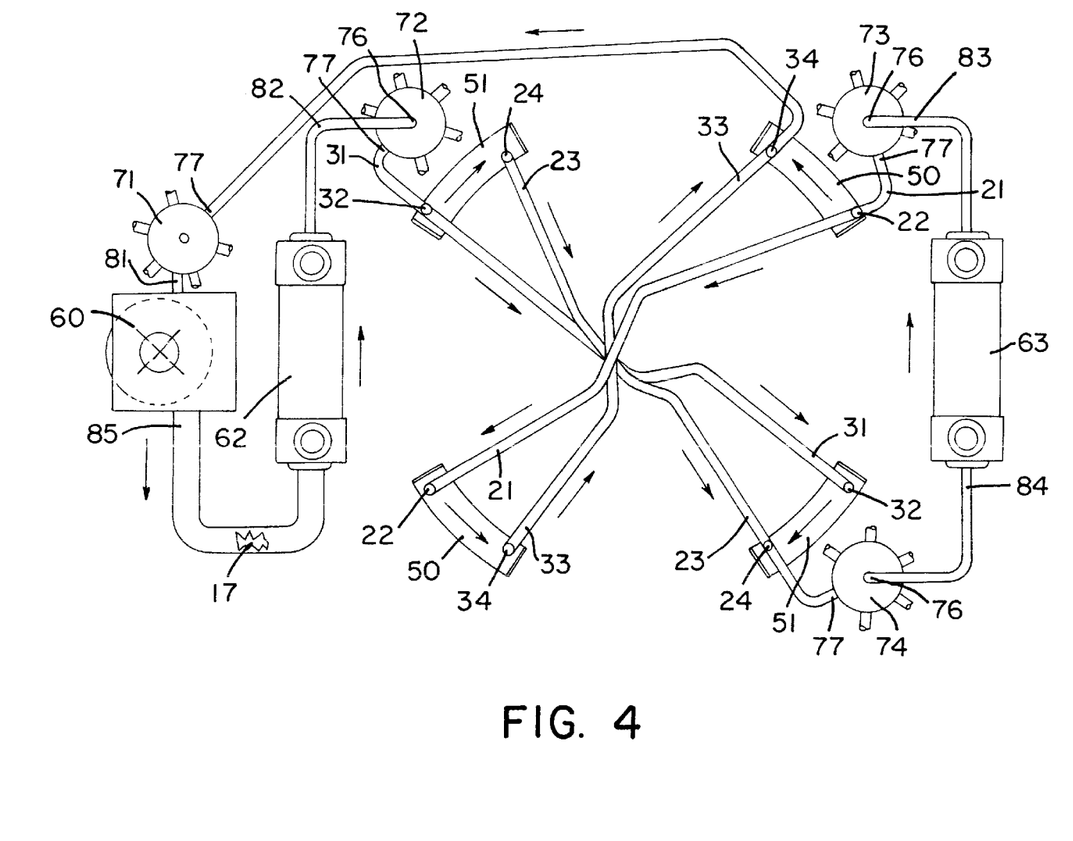
FIG. 4 is a plan view of the heat transfer fluid components in the rotating magnet magnetic refrigerator of FIG. 1.

As best shown in FIGS. 2 and 4, each compartment 13 has a pair of fluid access ports and associated pipes at its cold side 15 including a cold side inlet pipe 21 connected to a cold side inlet port 22 and a cold side outlet port 23 connected to a cold side outlet pipe 24, and a pair of fluid access ports and associated pipes at its hot side 16, composed of a hot side inlet pipe 31 and hot side inlet port 32 and a hot side outlet port 34 and hot side outlet pipe 33.

Figure 5:
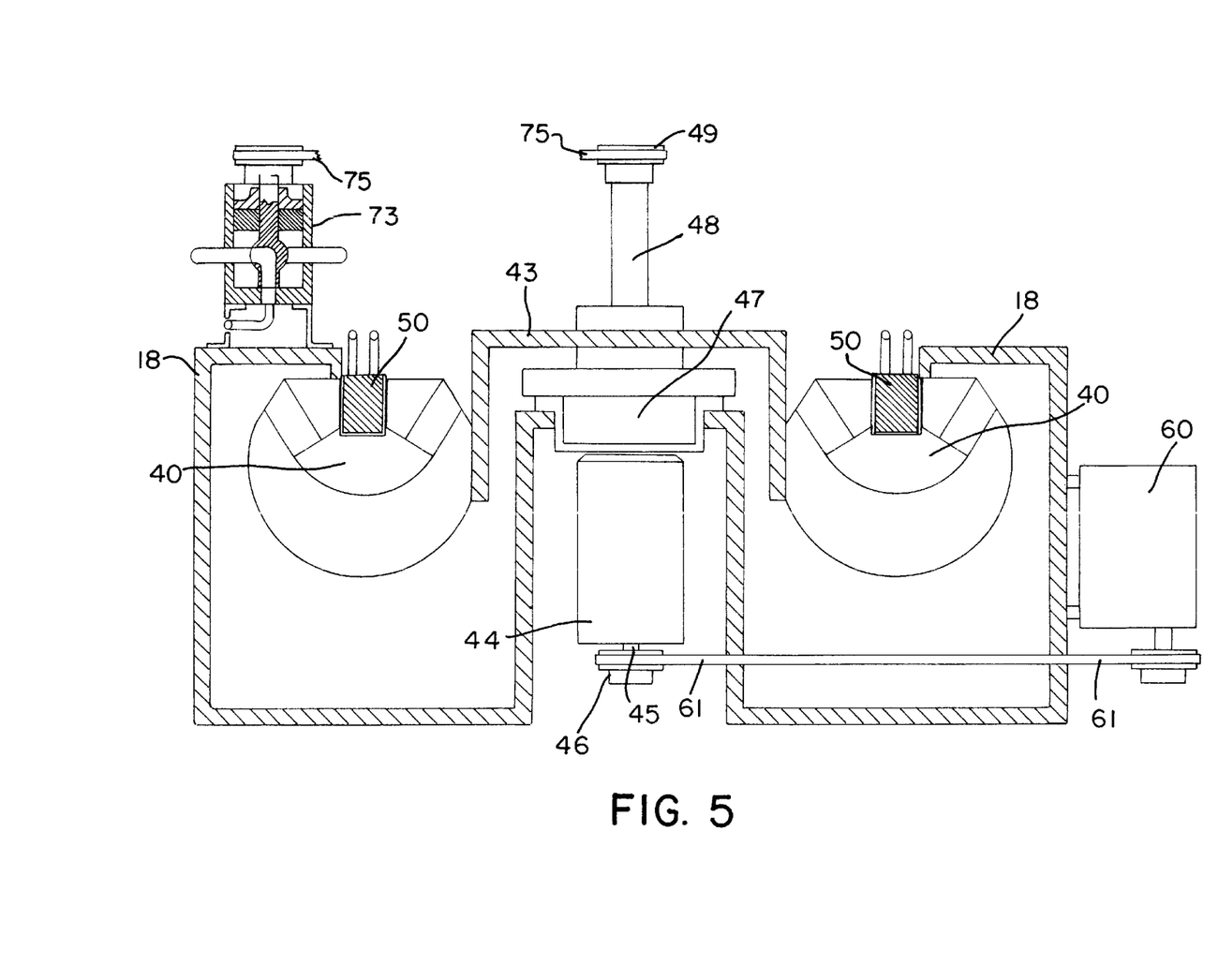
FIG. 5 is a cross-sectional view of the magnetic refrigerator taken generally along the lines 5—5 of FIG. 1.
Figure 6:
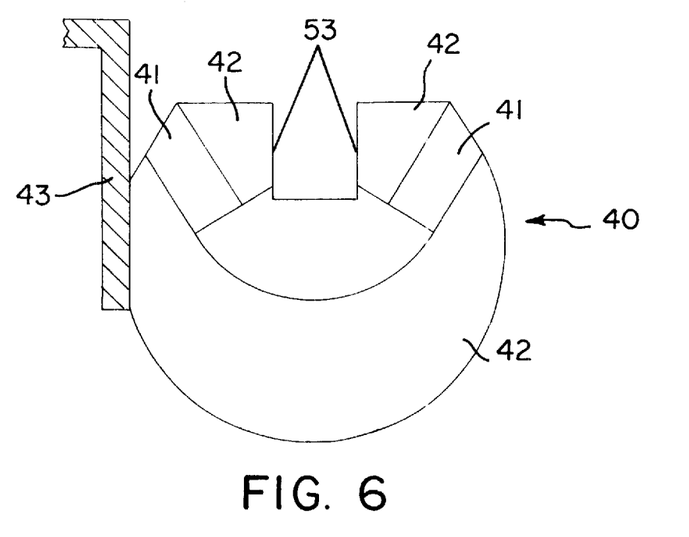
FIG. 6 is a cross-sectional view of an exemplary magnet for use in the magnetic refrigerator of FIG. 1.
Figure 7:
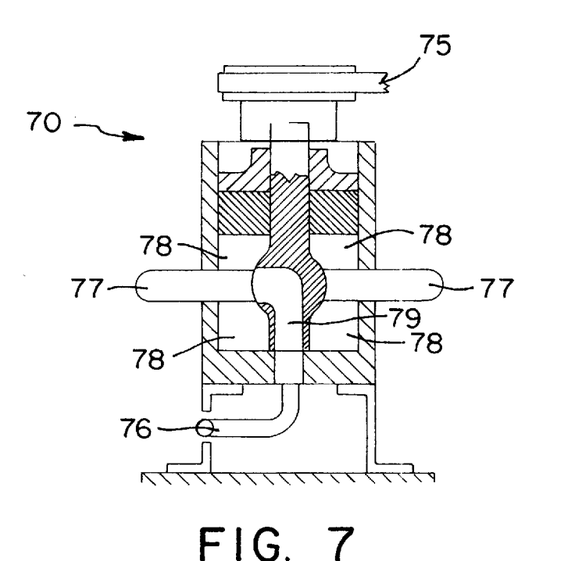
FIG. 7 is a cross-sectional view of an exemplary valve for use in the magnetic refrigerator of FIG. 1.

One or more magnets 40 are mounted for circular motion to allow them to be circularly driven around the stationary annular container 11 of magnetocaloric material 12. As best shown in FIG. 5, each magnet 40 may be mounted on a rotating magnet mount 43, which may be driven by a motor 44. As best shown in FIG. 6, each magnet 40 may have opposing faces 53 which focus the magnetic flux through a compartment 13 containing magnetocaloric material 12. As best shown in FIGS. 5 and 6, the magnet 40 is a permanent magnet which may be comprised of one or more permanently magnetized sections 41 and one or more iron sections 42.

As best shown in FIG. 3, the magnet design is such that the flux emerging from the magnets 40 through faces 53 is concentrated in one or more compartments 13 that are in regions 50 that are nearest the magnets 40, while almost no flux enters those compartments 13 that are in regions 51 that are far from the magnets 40. An intermediate level of flux may enter compartments 13 that are in regions 52 that are at an intermediate distance from the magnets 40. The motion of the magnets 40 thus produces a cyclic variation of magnetic field strength at each compartment 13, which in turn leads to cyclic variation in temperature of the magnetocaloric material 12 via the magnetocaloric effect. At a given time, those compartments 13 that are in regions 50 will be at a relatively high magnetic field, those compartments 13 that are in regions 51 will be at a relatively low field, and those compartments 13 that are in regions 52 will be at a field of intermediate strength.

As best shown in FIG. 4, a heat transfer fluid pump 60, which may be run at constant speed, is connected to a fluid flow circuit composed of a heat transfer fluid 17 suffusing the circuit, a hot heat exchanger 62, a cold heat exchanger 63, a number of valves 71–74, the compartments 13, and connecting piping and ports. Only one-sixth of the pipes associated with the beds are shown in FIGS. 1 and 4.

As best shown in FIG. 5, the motor 44 may include a motor shaft 45. A pump drive pulley 46 may be attached to the motor shaft 45, and a pump drive belt 61 may be used to drive the heat transfer fluid pump 60. A speed reducer 47 which includes a speed reducer shaft 48 may also be attached to the motor shaft 45. As best shown in FIGS. 1 and 5, a valve drive pulley 49 may be attached to the speed reducer shaft 48, and a valve drive belt 75 may be used to drive the valves 71–74.

As best shown in FIGS. 1 and 4, at the time when the magnets 40 are sitting over the compartments 13 that are located in regions 50, the valves 71–74 are set into positions such that heat transfer fluid 17 entering the valve 73 through axial port 76 from pipe 83 is directed by the valve 73 through a radial port 77 to cold side inlet pipes 21 and cold side inlet ports 22 to the compartments 13 that are in regions 50 at high magnetic field, where the heat transfer fluid 17 is warmed by the magnetocaloric material 12, then through hot side outlet ports 34 and hot side outlet pipes 33 to a radial port 77 on valve 71, thence through the axial port 76 to pipe 81 to the fluid pump 60, then through pipe 85 to the hot heat exchanger 62, where heat is given off to the environment.

As best shown in FIGS. 1 and 6, the heat transfer fluid leaves the hot heat exchanger 62 and then passes through the pipe 82 to the axial port 76 on the valve 72, where heat transfer fluid 17 is directed through a radial port 77 to hot side inlet pipes 31 and hot side inlet ports 32 to the compartments 13 that are in regions 51 at low magnetic field, where the heat transfer fluid 17 is cooled, and then through cold side outlet ports 24 and cold side outlet pipes 23 to a radial port 77 on valve 74, thence through the axial port 76 and through pipe 84 to the cold heat exchanger 63, where the thermal load is cooled.

As the magnet(s) 40 are moved around the stationary annular container 11, different compartments 13 are exposed to high and low magnetic field, and the setting of the valves 71–74 and thus the flow in the piping and in the compartments 13, are changed accordingly. The valves 71–74 are set such that the flow of heat transfer fluid 17 in the hot and cold heat exchangers 62–63, and in each pipe 81–85 between the fluid pump 60, valves 71–74 and the heat exchangers 62–63 is in a single direction. Moreover, the flow of heat transfer fluid 17 in the piping between the compartments 13 and the heat exchangers 62–63 is set such that the flow in each pipe is either in a unique direction, or is zero.

By correct setting of the valves 71–74 it is thus possible to avoid the effects of dead volume in the heat exchangers 62–63 or the piping to the heat exchangers 62–63 by ensuring unidirectional flow everywhere except inside the compartments 13, where correctly timed reversing flow occurs. The only seals 78 that are exposed to moving surfaces, and that thus possibly generate frictional heating, are in the valves 71–74 and perhaps the pump 60. These seals are compact and are exposed to relatively low surface velocities.

There are various possibilities with regard to alternative embodiments of a magnetic refrigeration apparatus according to the invention.

In the above described embodiment, two magnets 40 are used, and flow from the cold heat exchanger 63 is directed to a single pair of compartments 13 in the regions 50 at high magnetic field through a single port of the valve 73, but this is not required. The magnets 40 may cast a high magnetic field over more than one pair of compartments 13 at a given time, in which case it is advantageous for flow from the cold heat exchanger 63 to be directed simultaneously to more than one pair of compartments 13. This may be done with the same piping system as described above by changing the valves 71–74 such that flow occurs simultaneously through multiple radial ports 77. The valves 71–74 may also be constructed so that the flow to a given radial port 77 turns on gradually, which can be made to occur in synchrony with a gradual increase or decrease in magnetic field at the corresponding compartment 13. A different number of magnets 40 or a different number of compartments 13 can be handled by a similar flow system to that described above, but with a different arrangement of valves and pipes. The valves 71–74 may be multiple position valves, two position valves, or a combination of multiple position and check valves.

Although in a preferred embodiment, an apparatus according to the invention may be used as a magnetic refrigerator, other applications of the apparatus are possible. For example, the apparatus may operate as a heat pump to provide heating by connecting the hot heat exchanger 62 to the body to be heated, and by connecting the cold heat exchanger 63 to the environment. Similarly, the apparatus may be used in an air conditioner to provide residential cooling, or in any application which utilizes heat transfer to provide a useful result. Additional flow ports, heat exchangers or pumps may also be used.

Although in a preferred embodiment the compartments 13 with ports as discussed above provide fluid flow in a circumferential direction, as best shown in FIGS. 1, 2, and 4, this is not required. Alternatively, the stationary annular container 11 may have compartments 13 which are constructed for radial or axial flow. The magnetocaloric material 12 must be porous to flow, but may be in the form of particles, or thin sheets, or other high surface area geometries, which may be packed in simple physical contact, or bonded together. If unbonded particles are used, they may be prevented from escaping the compartment by use of screens or finely perforated sheets covering the inlet and exit ports.

Although in a preferred embodiment a liquid is used as a heat transfer fluid, other media for heat transfer may be used. For example, a gas could be used as a heat transfer medium, alone or in combination with a liquid.

Although in a preferred embodiment a stationary annular (ring shaped) container 11 of magnetocaloric material 12 separated into a number of compartments 13 is used, other arrangements of magnetocaloric material 12 could be used. For example, the container 11 of magnetocaloric material 12 may be formed as a disk having no central hole. There could be a greater or lesser number of compartments, there may be gaps in the container 11 between the compartments 13 containing magnetocaloric material 12, or there may be portions of the container 11 which do not contain magnetocaloric material 12. The container 11 may be comprised of a plurality of segments, or form a polygon which approximates an annular shape.

Although in a preferred embodiment, two magnets comprised of multiple magnet sections and multiple iron sections are used, other magnet arrangements could be used. For example, there could be a greater or lesser number of magnet sections, or a greater or lesser number of iron sections, or a greater or lesser number of magnets.

Although in a preferred embodiment, the magnetocaloric material is near a ferromagnetic to paramagnetic transition, in which case the material heats when magnetized and cools when demagnetized, other types of magnetocaloric materials may be used that cool when magnetized and heat when demagnetized. In the latter case, the fluid flow directions in the magnetized and demagnetized compartments would be in the reverse sense to that described above.

It is understood that the invention is not confined to the particular embodiments set forth herein as illustrative, but embraces all such forms thereof as come within the scope of the following claims.

What is claimed is:

1. A method of transferring heat comprising the steps of:
   (a) providing an annular container having a center and including a magnetic regenerator compartment arranged at a selected radius from the center, wherein the magnetic regenerator compartment has a hot side and a cold side;
   (b) providing magnetocaloric material located in the magnetic regenerator compartment, wherein the magnetocaloric material is configured to allow fluid flow through such magnetocaloric material;
   (c) providing a rotatable magnet assembly which includes a magnet located adjacent to a portion of the magnetic regenerator compartment;
   (d) rotating the magnet assembly to produce a cyclic variation in magnetic field strength in the magnetic regenerator compartment as the magnet assembly rotates;
   (e) providing a heat transfer fluid; and
   (f) passing the heat transfer fluid through the magnetic regenerator compartment.

2. The method of claim 1 wherein the step of passing the heat transfer fluid through the magnetic regenerator compartment includes the steps of:
   (a) passing the heat transfer fluid through the magnetic regenerator compartment from the hot side to the cold side of the magnetic regenerator compartment when the magnetic field strength in the magnetic regenerator compartment is relatively low; and
   (b) passing the heat transfer fluid through the magnetic regenerator compartment from the cold side to the hot side of the magnetic regenerator compartment when the magnetic field strength in the magnetic regenerator compartment is relatively high.

3. The method of claim 1 wherein the cold side of each magnetic regenerator compartment is adjacent to the cold side of an adjacent magnetic regenerator compartment and the hot side of each magnetic regenerator compartment is adjacent to the hot side of an adjacent magnetic regenerator compartment.

4. The method of claim 1 wherein the step of passing the heat transfer fluid through the magnetic regenerator compartment includes passing the heat transfer fluid through the magnetic regenerator compartment from the hot side to the cold side of the magnetic regenerator compartment when the magnetic field strength in the magnetic regenerator compartment is relatively low, and further comprising the steps of:

(a) providing a hot heat exchanger; and (b) passing the heat transfer fluid through the hot heat exchanger after passing the heat transfer fluid through the magnetic regenerator compartment from the cold side to the hot side of the magnetic regenerator compartment.

5. The method of claim 1 wherein the step of passing the heat transfer fluid through the magnetic regenerator compartment includes passing the heat transfer fluid through the magnetic regenerator compartment from the cold side to the hot side of the magnetic regenerator compartment when the magnetic field strength in the magnetic regenerator compartment is relatively high, and further comprising the steps of:

(a) providing a cold heat exchanger; and (b) passing the heat transfer fluid through the cold heat exchanger after passing the heat transfer fluid through the magnetic regenerator compartment from the hot side to the cold side of the magnetic regenerator compartment.

6. The method of claim 1 wherein the step of passing the heat transfer fluid through the magnetic regenerator compartment includes passing the heat transfer fluid through the magnetic regenerator compartment from the cold side to the hot side of the magnetic regenerator compartment when the magnet is adjacent to the magnetic regenerator compartment.

7. The method of claim 1 wherein the step of passing the heat transfer fluid through the magnetic regenerator compartment includes passing the heat transfer fluid through the magnetic regenerator compartment from the hot side to the cold side of the magnetic regenerator compartment when the magnet is not adjacent to the magnetic regenerator compartment.

8. A heat transfer apparatus comprising:

(a) an annular container having a central axis, and which includes a plurality of magnetic regenerator compartments, each magnetic regenerator compartment containing magnetocaloric material that allows the flow of heat transfer fluid through such magnetocaloric material, and each magnetic regenerator compartment having a hot side and a cold side;

(b) a magnet mounted for rotation about the central axis of the annular container, the magnet providing a magnetic field that at a first rotational position passes a relatively high magnetic field strength through a first magnetic regenerator compartment in the plurality of magnetic regenerator compartments and passes a relatively low magnetic field strength through a second magnetic regenerator compartment in the plurality of magnetic regenerator compartments, wherein at a second rotational position the magnet passes a relatively low magnetic field strength through the first magnetic regenerator compartment and passes a relatively high magnetic field strength through the second magnetic regenerator compartment;

(c) a hot heat exchanger; and (d) a valve having an axial port, a first radial port and a second radial port, the axial port of the valve connected by a first pipe to the hot heat exchanger, the first radial port of the valve connected by a second pipe to the hot side of the second magnetic regenerator compartment.

9. The apparatus of claim 8 wherein the heat transfer fluid flows circumferentially through the second magnetic regenerator compartment.

10. The apparatus of claim 8 wherein there are an even number of magnetic regenerator compartments in the plurality of magnetic regenerator compartments.

11. The apparatus of claim 10 wherein the cold side of each magnetic regenerator compartment is adjacent to the cold side of an adjacent magnetic regenerator compartment, and the hot side of each magnetic regenerator compartment is adjacent to the hot side of an adjacent magnetic regenerator compartment.

12. The apparatus of claim 11 wherein each magnetic regenerator compartment further comprises a cold side input port, and wherein the cold side input port of each magnetic regenerator compartment is adjacent to the cold side input port of an adjacent magnetic regenerator compartment, and the cold side input port of each magnetic regenerator compartment is open to the adjacent cold side input port of an adjacent magnetic regenerator compartment for fluid flow.

13. The apparatus of claim 11 wherein each magnetic regenerator compartment further comprises a cold side output port, and wherein the cold side output port of each magnetic regenerator compartment is adjacent to the cold side output port of an adjacent magnetic regenerator compartment, and the cold side output port of each magnetic regenerator compartment is open to the adjacent cold side output port of an adjacent magnetic regenerator compartment for fluid flow.

14. The apparatus of claim 11 wherein each magnetic regenerator compartment further comprises a hot side input port, and wherein the hot side input port of each magnetic regenerator compartment is adjacent to the hot side input port of an adjacent magnetic regenerator compartment, and the hot side input port of each magnetic regenerator compartment is open to the hot side input port of an adjacent magnetic regenerator compartment for fluid flow.

15. The apparatus of claim 11 wherein each magnetic regenerator compartment further comprises a hot side output port, and wherein the hot side output port of each magnetic regenerator compartment is adjacent to the hot side output port of an adjacent magnetic regenerator compartment, and the hot side output port of each magnetic regenerator compartment is open to the hot side output port of an adjacent magnetic regenerator compartment for fluid flow.

16. A heat transfer apparatus comprising:

(a) an annular container having a central axis, and which includes a plurality of magnetic regenerator compartments, each magnetic regenerator compartment containing magnetocaloric material that allows the flow of heat transfer fluid through such magnetocaloric material, and each magnetic regenerator compartment having a hot side and a cold side;

(b) a magnet mounted for rotation about the central axis of the annular container, the magnet providing a magnetic field that at a first rotational position passes a relatively high magnetic field strength through a first magnetic regenerator compartment in the plurality of magnetic regenerator compartments and passes a relatively low magnetic field strength through a second magnetic regenerator compartment in the plurality of magnetic regenerator compartments, wherein at a second rotational position the magnet passes a relatively low magnetic field strength through the first magnetic regenerator compartment and passes a relatively high magnetic field strength through the second magnetic regenerator compartment;

(c) a cold heat exchanger; and (d) a valve having an axial port, a first radial port and a second radial port, the axial port of the valve connected by a first pipe to the cold heat exchanger, the first radial port of the valve connected by a second pipe to the cold side of the first magnetic regenerator compartment.

17. The apparatus of claim 16 wherein the heat transfer fluid flows circumferentially through the first magnetic regenerator compartment.

18. The apparatus of claim 16 wherein there are an even number of magnetic regenerator compartments in the plurality of magnetic regenerator compartments.

19. The apparatus of claim 16 wherein the cold side of each magnetic regenerator compartment is adjacent to the cold side of an adjacent magnetic regenerator compartment, and the hot side of each magnetic regenerator compartment is adjacent to the hot side of an adjacent magnetic regenerator compartment.

20. The apparatus of claim 19 wherein each magnetic regenerator compartment further comprises a cold side input port, and wherein the cold side input port of each magnetic regenerator compartment is adjacent to the cold side input port of an adjacent magnetic regenerator compartment, and the cold side input port of each magnetic regenerator compartment is open to the adjacent cold side input port of an adjacent magnetic regenerator compartment for fluid flow.

21. The apparatus of claim 19 wherein each magnetic regenerator compartment further comprises a cold side output port, and wherein the cold side output port of each magnetic regenerator compartment is adjacent to the cold side output port of an adjacent magnetic regenerator compartment, and the cold side output port of each magnetic regenerator compartment is open to the adjacent cold side output port of an adjacent magnetic regenerator compartment for fluid flow.

22. The apparatus of claim 19 wherein each magnetic regenerator compartment further comprises a hot side input port, and wherein the hot side input port of each magnetic regenerator compartment is adjacent to the hot side input port of an adjacent magnetic regenerator compartment, and the hot side input port of each magnetic regenerator compartment is open to the adjacent hot side input port of an adjacent magnetic regenerator compartment for fluid flow.

23. The apparatus of claim 19 wherein each magnetic regenerator compartment further comprises a hot side output port, and wherein the hot side output port of each magnetic regenerator compartment is adjacent to the hot side output port of an adjacent magnetic regenerator compartment, and the hot side output port of each magnetic regenerator compartment is open to the adjacent hot side output port of an adjacent magnetic regenerator compartment for fluid flow.

24. A heat transfer apparatus comprising:

(a) an annular container having a central axis, and which includes a plurality of magnetic regenerator compartments, each magnetic regenerator compartment containing magnetocaloric material that allows the flow of heat transfer fluid through such magnetocaloric material, and each magnetic regenerator compartment having a hot side and a cold side;

(b) a magnet mounted for rotation about the central axis of the annular container, the magnet providing a magnetic field that at a first rotational position passes a relatively high magnetic field strength through a first magnetic regenerator compartment in the plurality of magnetic regenerator compartments and passes a relatively low magnetic field strength through a second magnetic regenerator compartment in the plurality of magnetic regenerator compartments, wherein at a second rotational position the magnet passes a relatively low magnetic field strength through the first magnetic regenerator compartment and passes a relatively high magnetic field strength through the second magnetic regenerator compartment; and (c) a valve having an axial port, a rotating inner assembly, and a plurality of radial ports, wherein the rotating inner assembly rotates to connect fluid flow between the axial port and one or more of the radial ports.

25. The apparatus of claim 24 wherein the rotating inner assembly rotates synchronously with the rotation of the magnet.

26. The apparatus of claim 24 wherein the magnet cross section is C-shaped.

27. The apparatus of claim 24 wherein the first magnetic regenerator compartment is adapted to allow substantially circumferential heat transfer fluid flow therethrough.

28. The apparatus of claim 24 wherein there are an even number of magnetic regenerator compartments in the plurality of magnetic regenerator compartments.

29. The apparatus of claim 24 wherein the cold side of each magnetic regenerator compartment is adjacent to the cold side of an adjacent magnetic regenerator compartment, and the hot side of each magnetic regenerator compartment is adjacent to the hot side of an adjacent magnetic regenerator compartment.

30. The apparatus of claim 24 wherein each magnetic regenerator compartment further comprises a cold side input port, and wherein the cold side input port of each magnetic regenerator compartment is open to the cold side input port of an adjacent magnetic regenerator compartment for fluid flow.

31. The apparatus of claim 24 wherein each magnetic regenerator compartment further comprises a cold side output port, and wherein the cold side output port of each magnetic regenerator compartment open to the cold side output port of an adjacent magnetic regenerator compartment for fluid flow.

32. The apparatus of claim 24 wherein each magnetic regenerator compartment further comprises a hot side input port, and wherein the hot side input port of each magnetic regenerator compartment is open to the hot side input port of an adjacent magnetic regenerator compartment for fluid flow.

33. The apparatus of claim 24 wherein each magnetic regenerator compartment further comprises a hot side output port, and wherein the hot side output port of each magnetic regenerator compartment is open to the hot side output port of an adjacent magnetic regenerator compartment for fluid flow.

34. The apparatus of claim 24 further comprising a hot heat exchanger, wherein a first radial port in the plurality of radial ports of the valve is connected for fluid flow to the hot side of the first magnetic regenerator compartment, a second radial port in the plurality of radial ports of the valve is connected for fluid flow to the hot side of the second magnetic regenerator compartment, and the axial port of the valve is connected for fluid flow to the hot heat exchanger.

35. The apparatus of claim 24 further comprising a cold heat exchanger, wherein a first radial port in the plurality of radial ports of the valve is connected for fluid flow to the cold side of the first magnetic regenerator compartment, a second radial port in the plurality of radial ports of the valve is connected for fluid flow to the cold side of the second magnetic regenerator compartment, and the axial port of the valve is connected for fluid flow to the cold heat exchanger.

36. The apparatus of claim 24 wherein the valve is adapted to provide heat transfer fluid flow from the cold side of the first magnetic regenerator compartment through the magnetocaloric material of the first magnetic regenerator compartment to the hot side of the first magnetic regenerator compartment with the magnet at the first rotational position.

37. The apparatus of claim 24 wherein the valve is adapted to provide heat transfer fluid flow from the hot side of the second magnetic regenerator compartment through the magnetocaloric material of the second magnetic regenerator compartment to the cold side of the second magnetic regenerator compartment with the magnet at the first rotational position.

38. The apparatus of claim 24 wherein a first volume of heat transfer fluid flows from the cold side of the first magnetic regenerator compartment through the magnetocaloric material of the first magnetic regenerator compartment to the hot side of the first magnetic regenerator compartment and a second volume of heat transfer fluid flows from the hot side of the second magnetic regenerator compartment through the magnetocaloric material of the second magnetic regenerator compartment to the cold side of the second magnetic regenerator compartment with the magnet is at the first rotational position.

39. A heat transfer apparatus comprising:
  (a) a container forming at least a portion of an annulus having a central axis, and which includes a plurality of magnetic regenerator compartments, each magnetic regenerator compartment containing magnetocaloric material that allows the flow of heat transfer fluid through such magnetocaloric material;
  (b) a magnet mounted for at least partial rotation about said central axis, the magnet providing a magnetic field that at a first rotational position passes a relatively high magnetic field strength through a first magnetic regenerator compartment in the plurality of magnetic regenerator compartments and passes a relatively low magnetic field strength through a second magnetic regenerator compartment in the plurality of magnetic regenerator compartments, wherein at a second rotational position the magnet passes a relatively low magnetic field strength through the first magnetic regenerator compartment and passes a relatively high magnetic field strength through the second magnetic regenerator compartment; and
  (c) a valve having a first port connected for fluid flow to the first magnetic regenerator compartment, a second port connected for fluid flow to the second magnetic regenerator compartment, and a common port, wherein the valve can be adjusted to connect fluid flow between the common port and one or more of the first port and the second port.

40. The apparatus of claim 39 wherein the magnet cross section is C-shaped.

41. The apparatus of claim 39 wherein a heat transfer fluid flows substantially circumferentially through the first magnetic regenerator compartment.

42. The apparatus of claim 39 wherein there are an even number of magnetic regenerator compartments in the plurality of magnetic regenerator compartments.

43. The apparatus of claim 39 wherein each magnetic regenerator compartment has a hot side and a cold side, wherein the cold side of each magnetic regenerator compartment is adjacent to the cold side of an adjacent magnetic regenerator compartment, and wherein the hot side of each magnetic regenerator compartment is adjacent to the hot side of an adjacent magnetic regenerator compartment.

44. The apparatus of claim 39 wherein each magnetic regenerator compartment further comprises a cold side input port, and wherein the cold side input port of each magnetic regenerator compartment is open to the cold side input port of an adjacent magnetic regenerator compartment for fluid flow.

45. The apparatus of claim 39 wherein each magnetic regenerator compartment further comprises a cold side output port, and wherein the cold side output port of each magnetic regenerator compartment open to the cold side output port of an adjacent magnetic regenerator compartment for fluid flow.

46. The apparatus of claim 39 wherein each magnetic regenerator compartment further comprises a hot side input port, and wherein the hot side input port of each magnetic regenerator compartment is open to the hot side input port of an adjacent magnetic regenerator compartment for fluid flow.

47. The apparatus of claim 39 wherein each magnetic regenerator compartment further comprises a hot side output port, and wherein the hot side output port of each magnetic regenerator compartment is open to the hot side output port of an adjacent magnetic regenerator compartment for fluid flow.

48. The apparatus of claim 39 wherein each magnetic regenerator compartment has a hot side and a cold side, and further comprising a hot heat exchanger, wherein a first radial port in the plurality of radial ports of the valve is connected for fluid flow to the hot side of the first magnetic regenerator compartment, a second radial port in the plurality of radial ports of the valve is connected for fluid flow to the hot side of the second magnetic regenerator compartment, and the axial port of the valve is connected for fluid flow to the hot heat exchanger.

49. The apparatus of claim 39 wherein each magnetic regenerator compartment has a hot side and a cold side, and further comprising a cold heat exchanger, wherein a first radial port in the plurality of radial ports of the valve is connected for fluid flow to the cold side of the first magnetic regenerator compartment, a second radial port in the plurality of radial ports of the valve is connected for fluid flow to the cold side of the second magnetic regenerator compartment, and the axial port of the valve is connected for fluid flow to the cold heat exchanger.

50. The apparatus of claim 39 wherein each magnetic regenerator compartment has a hot side and a cold side, and wherein the valve is adapted to provide heat transfer fluid flow from the cold side of the first magnetic regenerator compartment through the magnetocaloric material of the first magnetic regenerator compartment to the hot side of the first magnetic regenerator compartment when the magnet is at the first rotational position.

51. The apparatus of claim 39 wherein each magnetic regenerator compartment has a hot side and a cold side, and wherein the valve is adapted to provide heat transfer fluid flow from the hot side of the second magnetic regenerator compartment through the magnetocaloric material of the second magnetic regenerator compartment to the cold side of the second magnetic regenerator compartment when the magnet is at the first rotational position.

52. The apparatus of claim 39 wherein each magnetic regenerator compartment has a hot side and a cold side, and wherein the valve is adapted to provide a first volume of heat transfer fluid flow from the cold side of the first magnetic regenerator compartment through the magnetocaloric material of the first magnetic regenerator compartment to the hot side of the first magnetic regenerator compartment and a second volume of heat transfer fluid flow from the hot side of the second magnetic regenerator compartment through the magnetocaloric material of the second magnetic regenerator compartment to the cold side of the second magnetic regenerator compartment when the magnet is at the first rotational position.

53. A method of transferring heat comprising the steps of:
(a) providing a container forming at least a portion of an annulus having a central axis and including a first magnetic regenerator compartment and a second magnetic regenerator compartment, wherein each magnetic regenerator compartment contains magnetocaloric material that allows the flow of heat transfer fluid through such magnetocaloric material;
(b) providing a magnet assembly movable about at least a portion of said container to a first magnet position and a second magnet position, wherein the magnet assembly at the first magnet position passes a relatively high magnetic field strength through the first magnetic regenerator compartment and a relatively low magnetic field strength through the second magnetic regenerator compartment, and wherein the magnet assembly at the second magnet position passes a relatively low magnetic field strength through the first magnetic regenerator compartment and a relatively high magnetic field strength through the second magnetic regenerator compartment;
(c) providing a valve having a first port connected for fluid flow to the first magnetic regenerator compartment, a second port connected for fluid flow to the second magnetic regenerator compartment, and a common port, wherein the valve can be set to a first valve position and a second valve position, wherein the valve can be adjusted to connect fluid flow between the common port and one of the first port and the second port; and
(d) moving the magnet assembly to the first magnet position and adjusting the valve to connect fluid flow between the common port of the valve and the first port of the valve.

54. The method of claim 53 wherein each magnetic regenerator compartment has a hot side and a cold side, and further comprising the steps of
(e) providing a heat transfer fluid; and
(f) passing the heat transfer fluid through the magnetocaloric material of the first magnetic regenerator compartment from the cold side of the first magnetic regenerator compartment to the hot side of the first magnetic regenerator compartment when the magnet is in the first magnet position.

55. The method of claim 53 wherein each magnetic regenerator compartment has a hot side and a cold side, and further comprising the steps of
(e) providing a heat transfer fluid; and
(f) passing the heat transfer fluid through the magnetocaloric material of the second magnetic regenerator compartment from the hot side of the second magnetic regenerator compartment to the cold side of the second magnetic regenerator compartment when the magnet is in the first magnet position.

56. The method of claim 53 further comprising the steps of
(e) providing a first volume of heat transfer fluid and a second volume of heat transfer fluid;

(f) passing the first volume of heat transfer fluid through the magnetocaloric material of the first magnetic regenerator compartment from the cold side of the first magnetic regenerator compartment to the hot side of the first magnetic regenerator compartment when the magnet is in the first magnet position; and
(g) passing the second volume of heat transfer fluid through the magnetocaloric material of the second magnetic regenerator compartment from the hot side of the second magnetic regenerator compartment to the cold side of the second magnetic regenerator compartment when the magnet is in the first magnet position.

57. The method of claim 53 wherein each magnetic regenerator compartment has a hot side and a cold side, wherein the first port of the valve is connected for fluid flow to the hot side of the first magnetic regenerator compartment, and wherein the second port of the valve is connected for fluid flow to the hot side of the second magnetic regenerator compartment, and further comprising the step of providing a hot heat exchanger wherein the hot heat exchanger is connected for fluid flow to the common port of the valve.

58. The method of claim 53 wherein each magnetic regenerator compartment has a hot side and a cold side, wherein the first port of the valve is connected for fluid flow to the cold side of the first magnetic regenerator compartment, and wherein the second port of the valve is connected for fluid flow to the cold side of the second magnetic regenerator compartment, and further comprising the step of providing a cold heat exchanger wherein the cold heat exchanger is connected for fluid flow to the common port of the valve.

59. The method of claim 53 further comprising the step of:
(e) moving the magnet assembly to the second magnet position and adjusting the valve to connect fluid flow between the common port of the valve and the second port of the valve.

60. The method of claim 59 wherein each magnetic regenerator compartment has a hot side and a cold side, and further comprising the steps of
(f) providing a heat transfer fluid;
(g) passing at least a portion of the heat transfer fluid through the magnetocaloric material of the first magnetic regenerator compartment from the cold side of the first magnetic regenerator compartment to the hot side of the first magnetic regenerator compartment when the magnet is in the first magnet position; and
(h) passing at least a portion of the heat transfer fluid through the magnetocaloric material of the first magnetic regenerator compartment from the hot side of the first magnetic regenerator compartment to the cold side of the first magnetic regenerator compartment when the magnet is in the second magnet position.

61. The method of claim 59 wherein each magnetic regenerator compartment has a hot side and a cold side, and further comprising the steps of
(f) providing a heat transfer fluid;
(g) passing at least a portion of the heat transfer fluid through the magnetocaloric material of the first magnetic regenerator compartment from the cold side of the first magnetic regenerator compartment to the hot side of the first magnetic regenerator compartment when the magnet is in the first magnet position; and
(h) passing at least a portion of the heat transfer fluid through the magnetocaloric material of the second magnetic regenerator compartment from the cold side of the second magnetic regenerator compartment to the hot side of the second magnetic regenerator compartment when the magnet is in the second magnet position.

62. A method of transferring heat comprising the steps of:
(a) providing a container forming at least a portion of an annulus having a central axis and including a first magnetic regenerator compartment and a second magnetic regenerator compartment, wherein each magnetic regenerator compartment contains magnetocaloric material that allows the flow of heat transfer fluid through such magnetocaloric material and wherein each magnetic regenerator compartment has a hot side and a cold side;
(b) providing a magnet assembly movable about at least a portion of said container to a first magnet position and a second magnet position, wherein the magnet assembly at the first magnet position passes a relatively high magnetic field strength through the first magnetic regenerator compartment and a relatively low magnetic field strength through the second magnetic regenerator compartment, and wherein the magnet assembly at the second magnet position passes a relatively low magnetic field strength through the first magnetic regenerator compartment and a relatively high magnetic field strength through the second magnetic regenerator compartment;
(c) providing a heat transfer fluid;
(d) moving the magnet assembly to the first magnet position; and then
(e) passing a first portion of the heat transfer fluid through the magnetocaloric material of the first magnetic regenerator compartment from the cold side of the first magnetic regenerator compartment to the hot side of the first magnetic regenerator compartment while passing a second portion of the heat transfer fluid through the magnetocaloric material of the second magnetic regenerator compartment from the hot side of the second magnetic regenerator compartment to the cold side of the second magnetic regenerator compartment.

63. The method of claim 62 further comprising the steps of:
(f) moving the magnet assembly to the second magnet position; and then
(g) passing a third portion of the heat transfer fluid through the magnetocaloric material of the first magnetic regenerator compartment from the hot side of the first magnetic regenerator compartment to the cold side of the first magnetic regenerator compartment while passing a fourth portion of the heat transfer fluid through the magnetocaloric material of the second magnetic regenerator compartment from the cold side of the second magnetic regenerator compartment to the hot side of the second magnetic regenerator compartment.

* * * * *

UNITED STATES PATENT AND TRADEMARK OFFICE
CERTIFICATE OF CORRECTION

PATENT NO. : 6,668,560 B2
DATED : December 30, 2003
INVENTOR(S) : Carl B. Zimm et al.

It is certified that error appears in the above-identified patent and that said Letters Patent is hereby corrected as shown below:

<u>Title page,</u>
Item [60], Related U.S. Application Data, please delete "60/346,765" and replace it with -- 60/340,765 --.

Signed and Sealed this

Third Day of August, 2004

JON W. DUDAS
*Acting Director of the United States Patent and Trademark Office*